(12) United States Patent
Morgan

(10) Patent No.: US 11,732,693 B1
(45) Date of Patent: Aug. 22, 2023

(54) HYDRATION TURBINE

(71) Applicant: John Morgan, Indianapolis, IN (US)

(72) Inventor: John Morgan, Indianapolis, IN (US)

( * ) Notice: Subject to any disclaimer, the term of this patent is extended or adjusted under 35 U.S.C. 154(b) by 0 days.

(21) Appl. No.: 17/713,509

(22) Filed: Apr. 5, 2022

(51) Int. Cl.
| | |
|---|---|
| *F03D 9/30* | (2016.01) |
| *F03D 1/06* | (2006.01) |
| *A62C 35/20* | (2006.01) |
| *A62C 3/02* | (2006.01) |
| *F03D 80/00* | (2016.01) |

(52) U.S. Cl.
CPC .............. *F03D 9/30* (2016.05); *A62C 3/0228* (2013.01); *A62C 35/20* (2013.01); *F03D 1/0675* (2013.01); *F03D 80/00* (2016.05)

(58) Field of Classification Search
CPC . F03D 1/00; F03D 1/0675; F03D 9/30; F03D 7/0204; F03D 7/0224; F03D 7/0633
See application file for complete search history.

(56) References Cited

U.S. PATENT DOCUMENTS

| | | | |
|---|---|---|---|
| 8,030,790 B2 | 10/2011 | Kamenov | |
| 8,492,918 B1 | 7/2013 | Kamenov | |
| 8,678,765 B2 * | 3/2014 | Bendel | F03D 1/0675 29/889.7 |
| 10,780,304 B1 * | 9/2020 | Moore | F03B 1/00 |
| 2009/0035148 A1 * | 2/2009 | Livingston | F03D 80/00 416/232 |
| 2016/0222945 A1 * | 8/2016 | Shiraishi | F03D 1/0675 |
| 2018/0128241 A1 * | 5/2018 | Hiremath | G05B 19/04 |

FOREIGN PATENT DOCUMENTS

CN      203677796      7/2014

* cited by examiner

*Primary Examiner* — Eldon T Brockman
*Assistant Examiner* — Maxime M Adjagbe

(57) ABSTRACT

A tower and a wind turbine and be able to shoot water from the center point of a three to five blade wind turbine in a concentrated direction and from the blades to disperse water/fire retardant in a light to heavy spray from the tips of the blades covering a wider area for creating clean energy and suppressing wildfires.

5 Claims, 5 Drawing Sheets

HYDRATION TURBINE

CROSS-REFERENCES TO RELATED APPLICATIONS

Not Applicable.

FIELD OF INVENTION

The present invention relates generally to a system for producing clean energy and preventing or controlling wildfires. More specifically, the present invention is directed towards a wind turbine water dispersal capacity.

BACKGROUND OF THE INVENTION

In forestry, widespread forest fires present a significant danger to both property and human lives. Containing wildfires in difficult terrain, such as in hilly and remote areas, can pose significant difficulty just to access. Traditionally, water helicopters are utilized to bring water to suppress fires in hard-to-reach hill sides and mountains.

There exists a need for an improved system to halt or contain widespread forest fires.

SUMMARY OF THE INVENTION

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The present invention is defined by the claims.

Embodiments of the present invention may include a 300-500-foot tower with three to five blades on a wind turbine. The turbine will have an ability to shoot a variation of water from the center point of the blades of the wind turbine at a range of up to 2000 feet in a concentrated direction. The top of the turbine which houses the blades can also rotate 360 degrees around its tower base to hit any specific are with water. This also gives each tower the ability to maximize the amount of wind it can harness from any direction. The top of each tower where the blades are located can also tilt back putting the face/front (at any angle up to 90 degrees) of the tower to the sky. This allows the blades to rotate dispersing water in a circular manner in light to heavy spray from the tips and edges of the blades. This increases the total amount of area each tower can cover an area up to 2000 feet across (4 mil sq feet).

The present invention may create clean energy and disperses water/fire retardant simultaneously. The functions of the present invention's wildfire prevention features include but are not limited to containing and/or stopping widespread wildfires, protecting both residential and commercial property from damage in areas prone to wildfires. Along with protecting vital roads and interstates to allow safe travel for persons escaping wildfires. Additionally, the water distribution features may have benefits in other contexts, including but not limited to providing consistent irrigation for large farm and/or agricultural land during droughts, and providing large dry and desert areas with a consistent water resource which could then create new grasslands, new wildlife areas, and new habitable areas for people.

BRIEF DESCRIPTION OF THE DRAWINGS

The present invention is described in detail below with reference to the attached drawing figures, wherein.

DETAILED DESCRIPTION OF THE INVENTION

Figure 1:
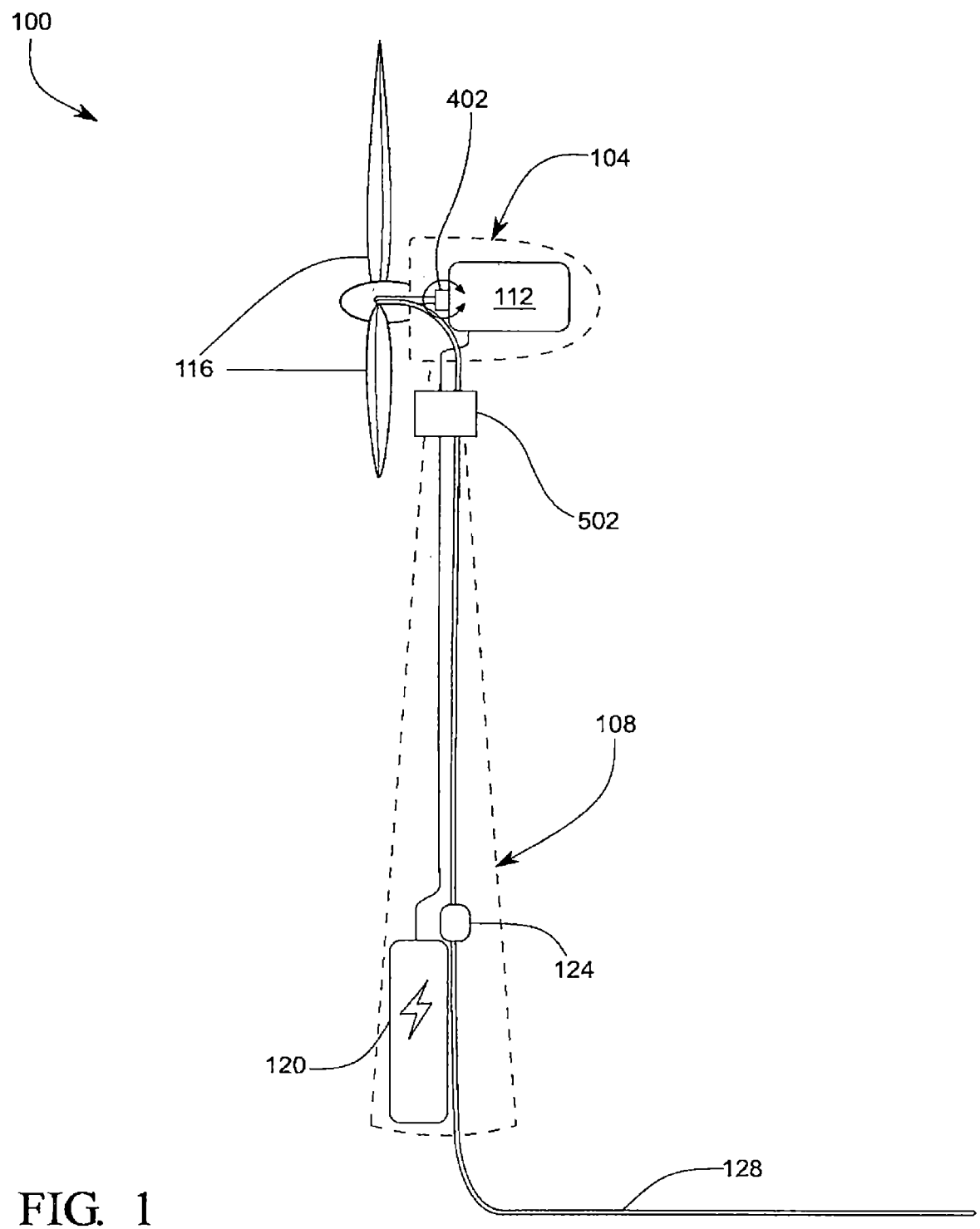
FIG. 1 provides a cut-away side view of an exemplary embodiment in accordance with aspects of the present invention.

Some embodiments of the present invention are described with specificity herein to meet statutory requirements. However, the scope of the invention is not intended to be defined by the description itself. The claimed subject matter may be embodied as to include distinctive features, elements, components, steps, or combinations of steps, like those described herein, and in combination with other existing or future technologies. Moreover, although the term "step" might be used to connote different elements of the methods employed, this term should not be interpreted as implying any particular order among or between various steps herein disclosed unless and except the order of individual steps is explicitly described or required.

Embodiments of the present invention may include a 300-500-foot tower and a three to five blade wind turbine and be able to shoot water from the center point of the blades wind turbine up to 2000 feet (about twice the height of the Empire State Building) in a concentrated direction while being able to rotate 360 degrees around its tower to hit any specific zone. The blades can also tilt back putting the face up to the sky allowing the blades to rotate dispersing water in a light to heavy spray from the tips of the blades covering an area up to 2000 feet across (4 mil sq feet).

The present invention may create clean energy and disperses water/fire retardant simultaneously. The functions of the present invention's wildfire prevention features include but are not limited to, containing and/or stopping widespread wildfires, protecting both residential and commercial property from damage in areas prone to wildfires, and protecting vital roads and interstates to allow safe travel for persons escaping wildfires. Additionally, the water distribution features may have benefits in other contexts, including but not limited to providing consistent irrigation for large farm and/or agricultural land during droughts, and providing large dry and desert areas with a consistent water resource which could then create new grasslands, new wildlife areas, and new habitable areas for people.

Embodiments of the present invention may comprise an apparatus comprising, a tower, a three to five blade turbine having a central rotor, a water outlet located at the central rotor configured to spray water/fire retardant, a set of three to five blade water outlets, a yaw pivot, and a pitch pivot. Each blade water outlet may be located at the end/edge of each of the blades of the turbine and the blade water outlets may be configured to spray water/fire retardant. The pitch pivot may attach to the turbine and may allow the turbine to tilt skyward. The yaw pivot may connect the pitch pivot and to the tower. The yaw pivot may allow the central rotor of the to turn 360° around the tower. In some embodiments, the tower may have a height of between 300 feet and 500 feet, inclusively.

Some embodiments may be used in a private setting, residential, or commercial application. Each unit may be operated anywhere in the world via an app, either individually or in a group setting. As used herein, "group setting" refers broadly to a group of turbines activated to irrigate a particular section of acreage for a purpose. Examples of such purposes include but are not limited to preventing and/or stopping wildfires, irrigation purposes, and the like. Each unit can be controlled to an independent direction while operating in a group setting. Along with irrigating farmland or other agricultural areas. Each turbine will have its own thermo-heating system which will ensure no water or portion of the turbine ever freezes. Each turbine can also be used to disburse enormous amounts of fire-retardant liquid, liquid fertilizers and or pesticides when used for agriculture purposes. All liquids besides water would come from an extra tank/supply reservoir. Each turbine will be constructed out of a lightweight fire-resistant material and be equipped with cameras capable of rotating 360 degrees and thermal imaging. Each turbine tower will have the capabilities to take air quality measurements and be outfitted with carbon blades (or other comparable technology) which can help purify the air as they turn.

In operation, embodiments of the present invention may enable method of combating forest fires comprising distributing water into a fire prone area from a wind turbine tower according to embodiments of this disclosure.

Some embodiments my operate off a water reservoir. In some other embodiments, a pipeline connected to the base of the turbine my provide a steady supply of water delivered from one of more large water supplies. Examples of such large water supplies may include, but are not limited to rivers, lakes, manufactured or natural reservoirs, aquifers and/or other groundwater sources, municipal and/or regional water systems, or the ocean or combinations thereof.

FIG. 1 provides a cut-away side view 100 of an exemplary embodiment in accordance with aspects of the present invention. As depicted, nacelle 104 is located at the top of tower 108. Generator 112 is housed within nacelle 104 and can generate electricity by harnessing wind power from turbine blades 116. Electricity generated by generator 112 can be store in battery 120 housed within tower 108. Battery 120 can provide power to water pump 124. Water pump 124 can draw water from supply line 128 and pump the water up through nacelle 104 to blades 116.

Figure 5:
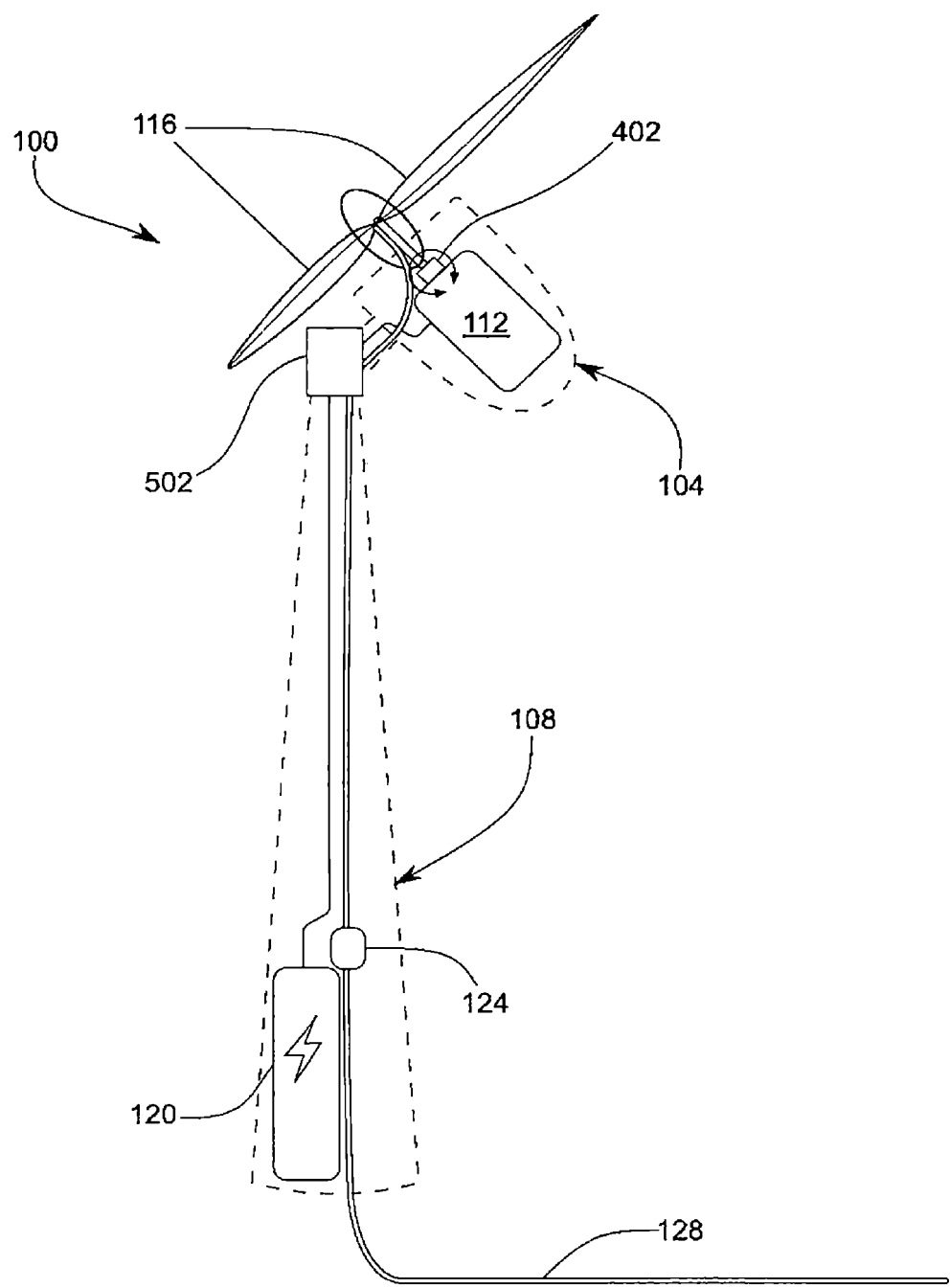
FIG. 5 provides a side view of an exemplary embodiment of the present invention tilted skyward.

With reference to FIG. 5, the apparatus is shown tilted skyward.

Figure 2:
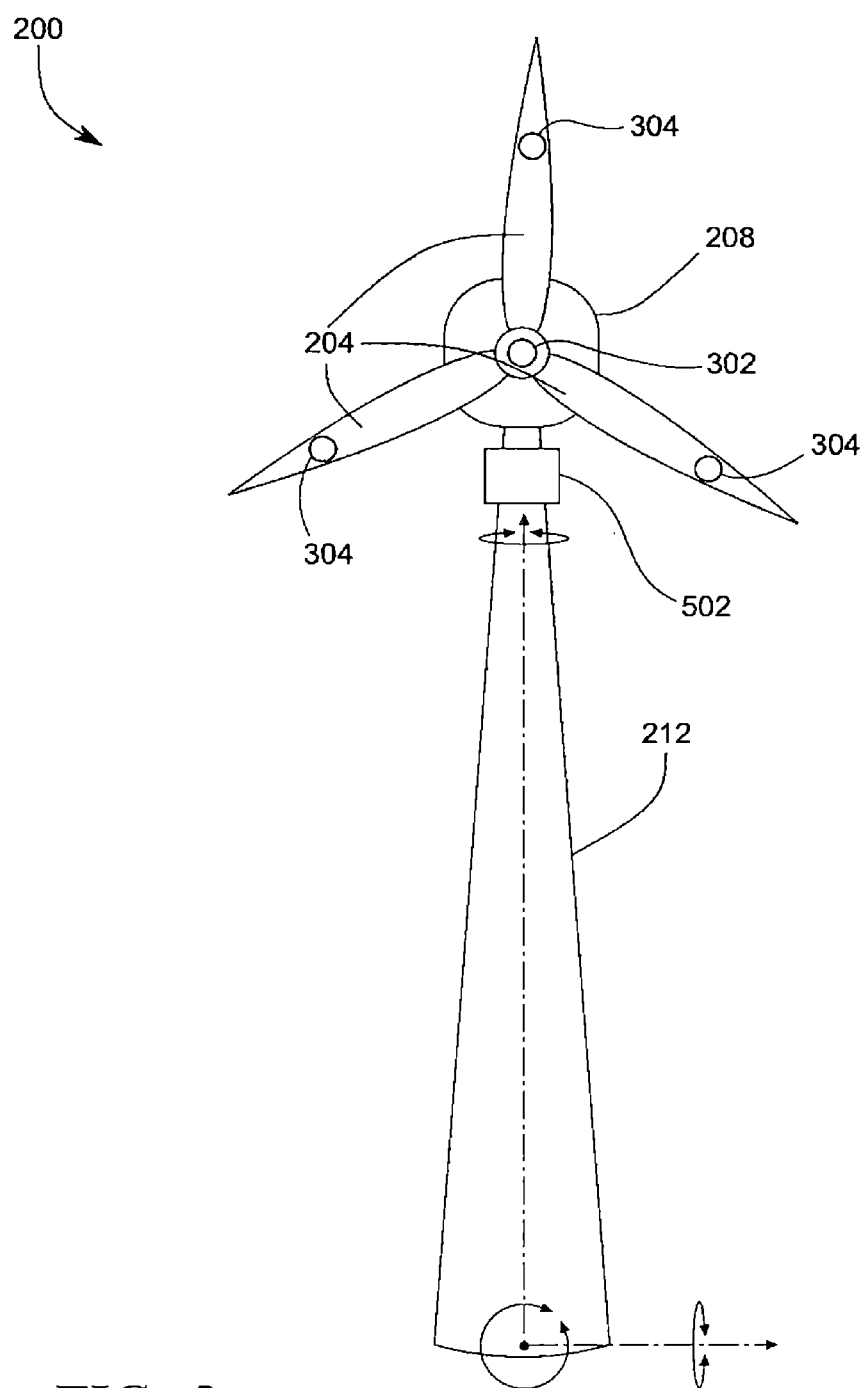
FIG. 2 provides a front view of an exemplary embodiment in accordance with aspects of the present invention.

FIG. 2 provides a front view 200 of an exemplary embodiment in accordance with aspects of the present invention. As depicted three blades 204 are connected to nacelle 208. Nacelle 208, in turn, is mounted atop tower 212.

Figure 3:
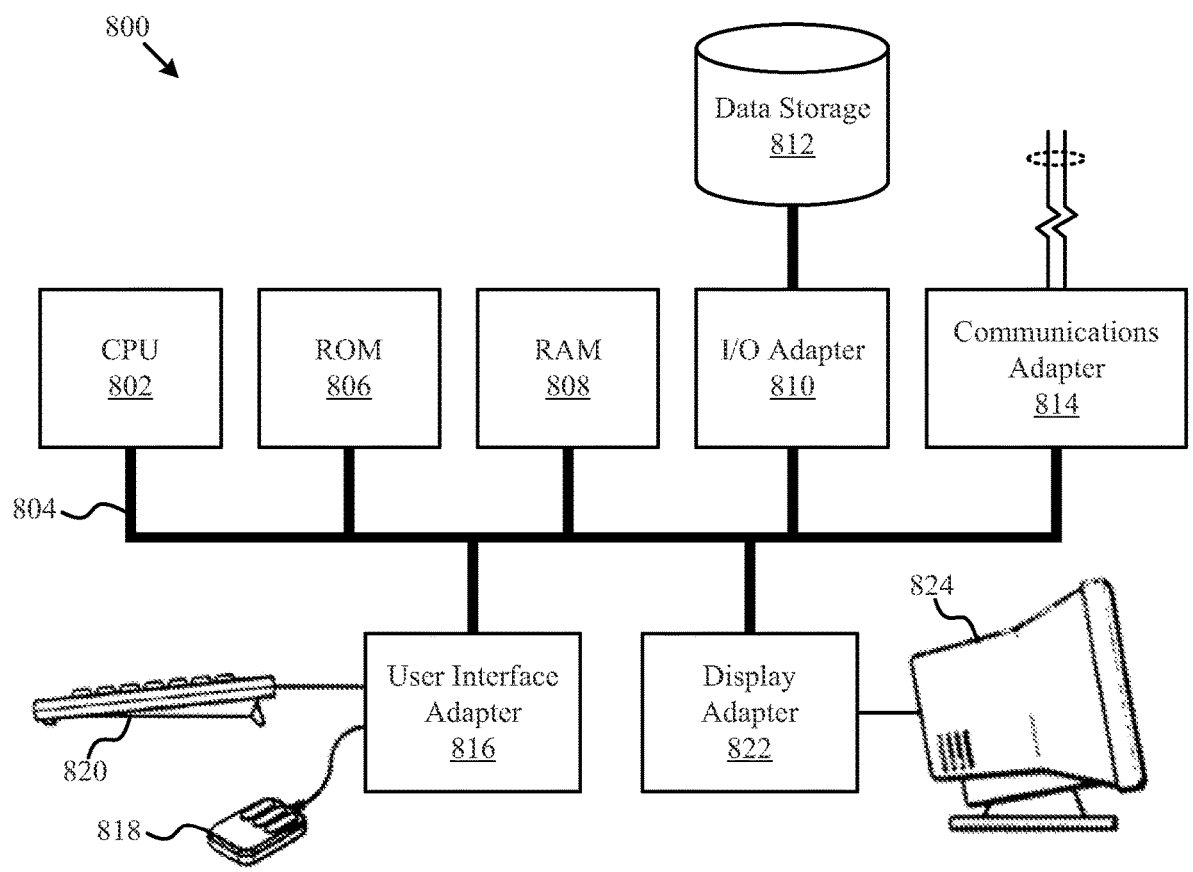
FIG. 3 illustrates a computer system adapted according to certain embodiments of the server and/or the user interface device.

FIG. 3 illustrates a computer system 800 adapted according to certain embodiments of the server and/or the user interface device. The central processing unit ("CPU") 802 is coupled to the system bus 804. The CPU 802 may be a general purpose CPU or microprocessor, graphics processing unit ("GPU"), and/or microcontroller. The present embodiments are not restricted by the architecture of the CPU 802 so long as the CPU 802, whether directly or indirectly, supports the operations as described herein. The CPU 802 may execute the various logical instructions according to the present embodiments.

The computer system 800 also may include random access memory (RAM) 808, which may be synchronous RAM (SRAM), dynamic RAM (DRAM), synchronous dynamic RAM (SDRAM), or the like. The computer system 800 may utilize RAM 808 to store the various data structures used by a software application. The computer system 800 may also include read only memory (ROM) 806 which may be PROM, EPROM, EEPROM, optical storage, or the like. The ROM may store configuration information for booting the computer system 800. The RAM 808 and the ROM 806 hold user and system data, and both the RAM 808 and the ROM 806 may be randomly accessed.

The computer system 800 may also include an input/output (I/O) adapter 810, a communications adapter 814, a user interface adapter 816, and a display adapter 822. The I/O adapter 810 and/or the user interface adapter 816 may, in certain embodiments, enable a user to interact with the computer system 800. In a further embodiment, the display adapter 822 may display a graphical user interface (GUI) associated with a software or web-based application on a display device 824, such as a monitor or touch screen.

The I/O adapter 810 may couple one or more storage devices 812, such as one or more of a hard drive, a solid state storage device, a flash drive, a compact disc (CD) drive, a floppy disk drive, and a tape drive, to the computer system 800. According to one embodiment, the data storage 812 may be a separate server coupled to the computer system 800 through a network connection to the I/O adapter 810. The communications adapter 814 may be adapted to couple the computer system 800 to the network 708, which may be one or more of a LAN, WAN, and/or the Internet. The communications adapter 814 may also be adapted to couple the computer system 800 to other networks such as a global positioning system (GPS) or a Bluetooth network. The user interface adapter 816 couples user input devices, such as a keyboard 820, a pointing device 818, and/or a touch screen (not shown) to the computer system 800. The keyboard 820 may be an on-screen keyboard displayed on a touch panel. Additional devices (not shown) such as a camera, microphone, video camera, accelerometer, compass, and or gyroscope may be coupled to the user interface adapter 816. The display adapter 822 may be driven by the CPU 802 to control the display on the display device 824. Any of the devices 802-822 may be physical and/or logical.

The applications of the present disclosure are not limited to the architecture of computer system 800. Rather the computer system 800 is provided as an example of one type of computing device that may be adapted to perform the functions of a server 702 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, state machine digital logic-based circuitry, or other circuitry.

The embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules. As such, persons of ordinary skill in the art may utilize any number of suitable electronic devices and similar structures capable of executing a sequence of logical operations according to the described embodiments. For example, the computer system 800 may be virtualized for access by multiple users and/or applications.

Figure 4A:
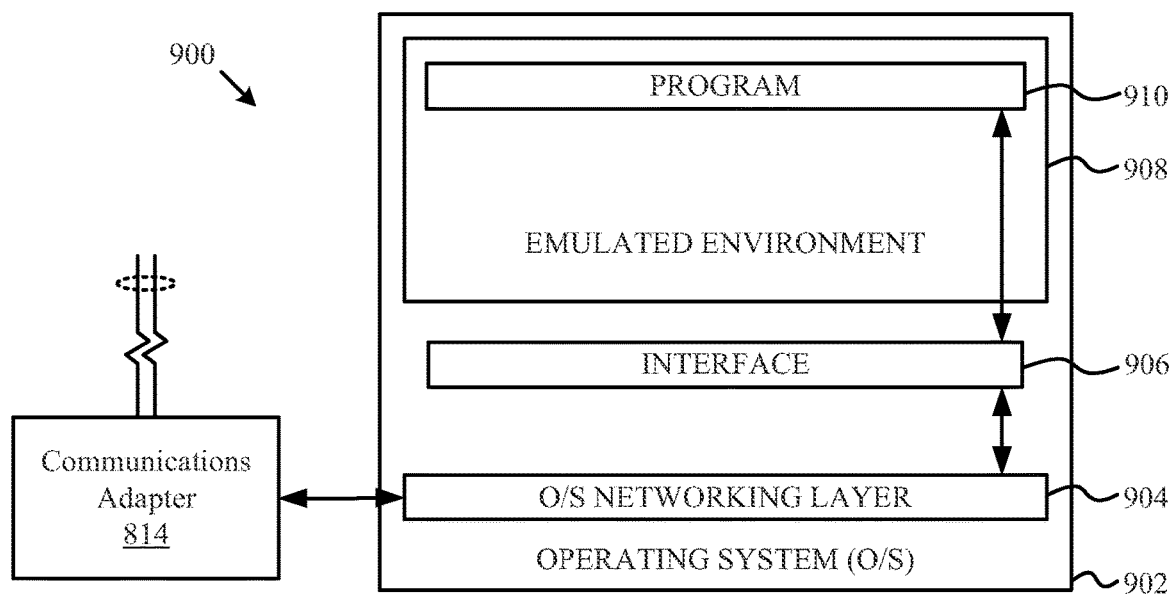
FIG. 4A is a block diagram illustrating a server hosting an emulated software environment for virtualization according to one embodiment of the disclosure.

FIG. 4A is a block diagram illustrating a server hosting an emulated software environment for virtualization according to one embodiment of the disclosure. An operating system 902 executing on a server includes drivers for accessing hardware components, such as a networking layer 904 for accessing the communications adapter 814. The operating system 902 may be, for example, Linux. An emulated environment 908 in the operating system 902 executes a program 910, such as CPCommOS. The program 910 accesses the networking layer 904 of the operating system 902 through a non-emulated interface 906, such as XNIOP. The non-emulated interface 906 translates requests from the program 910 executing in the emulated environment 908 for the networking layer 904 of the operating system 902.

Figure 4B:
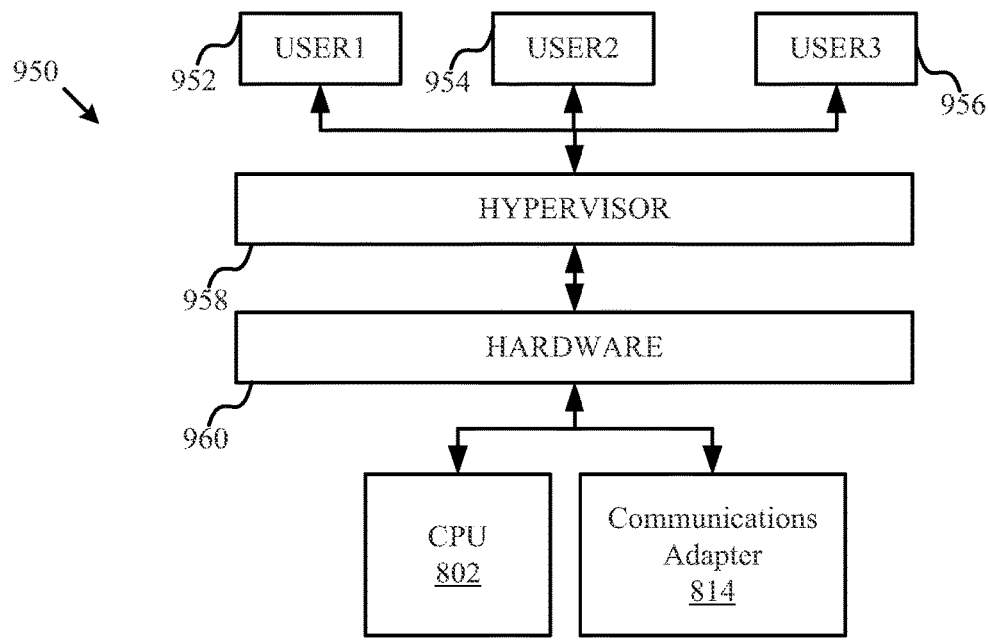
FIG. 4B is a block diagram illustrating a server hosting an emulated hardware environment according to one embodiment of the disclosure.

In another example, hardware in a computer system may be virtualized through a hypervisor. FIG. 4B is a block diagram illustrating a server hosting an emulated hardware environment according to one embodiment of the disclosure. Users 952, 954, 956 may access the hardware 960 through a hypervisor 958. The hypervisor 958 may be integrated with the hardware 960 to provide virtualization of the hardware 960 without an operating system, such as in the configuration illustrated in FIG. 9A. The hypervisor 958 may provide access to the hardware 960, including the CPU 802 and the communications adaptor 814.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Embodiments of the present invention have been described, as required by statute, to be illustrative, but should not be interpreted to be restrictive. One having skill in the art will recognize that many different arrangements of the various components depicted are possible without departing from the scope of the claims below, as well as arrangements including components not explicitly shown.

One having skill in the art will understand that certain combinations and/or sub-combinations of elements and features are of utility and may be employed without reference to other combinations and/or sub-combinations and are contemplated within the scope of the claims. Not all steps listed in the various figures need be carried out in the specific order described.

What is claimed is:

1. An apparatus comprising:
   a tower;
   a turbine having a central rotor and three or more blades;
   a fluid outlet located at the central rotor configured to spray a fertilizer fluid;
   a set of three or more blade fluid outlets, wherein each blade fluid outlet is located at the end of each of the blades of the turbine, wherein the blade fluid outlets are configured to spray the fertilizer fluid;
   a yaw pivot;
   a pitch pivot,
      wherein the pitch pivot attaches to the turbine and allows the turbine to tilt skyward, wherein the yaw pivot attaches to the pitch pivot and to the tower, wherein the yaw pivot allows the central rotor to rotate 360 degrees around the tower;
   at least one camera configured to rotate 360 degrees around the tower
      wherein the at least one camera is adapted for thermal imaging a surrounding environment,
a thermo-heating system,
wherein the thermo-heating system is configured to prevent any component of the apparatus from freezing in cold temperatures;
wherein the apparatus is constructed out of a lightweight fire-resistant material; and
wherein the apparatus is configured to simultaneously produce clean energy and extinguish a fire in the surrounding environment.

2. The apparatus of claim 1, wherein the tower has a height of between 300 feet and 500 feet, inclusively.

3. An apparatus for fire prevention and clean energy production, the apparatus comprising:
a tower;
a turbine having a central rotor and three or more blades;
wherein the blades are constructed from a carbon material adapted for purifying air from pollutants,
a fluid outlet located at the central rotor configured to a spray a fire-retardant fluid;
a set of three or more blade fluid outlets,
wherein each blade fluid outlet is located at the end of each of the blades of the turbine,
wherein the blade fluid outlets are configured to spray the fire retardant fluid;
a fire-retardant fluid reservoir configured to contain the fire-retardant fluid,
a yaw pivot; and
a pitch pivot,
wherein the pitch pivot attaches to the turbine and allows the turbine to tilt skyward,
wherein the yaw pivot attaches to the pitch pivot and to the tower,
wherein the yaw pivot allows the central rotor to rotate 360 degrees around the tower,
at least one camera configured to rotate 360 degrees around the tower, wherein the at least one camera is adapted for thermal imaging a surrounding environment, a thermo-heating system,
wherein the thermo-heating system is configured to prevent any component of the apparatus from freezing in cold temperatures;
wherein the apparatus is constructed out of a lightweight fire-resistant material; and
wherein the apparatus is configured to simultaneously produce clean energy and extinguish a fire in the surrounding environment.

4. The of claim 3, wherein the tower has a height of between 300 feet and 500 feet, inclusively.

5. A system for clean energy production and environmental management, the system comprising:
   a plurality of apparatuses,
      wherein each apparatus is configured to communicate and transmit information and instructions between each other;
      wherein each apparatus comprises:
         a tower;
         a turbine having a central rotor and three or more blades; wherein the blades are constructed from a carbon material adapted for purifying air from pollutants,
         a fluid outlet located at the central rotor configured to a spray a fire-retardant fluid;
         a set of three or more blade fluid outlets,
            wherein each blade fluid outlet is located at the end of each of the blades of the turbine,
            wherein the blade fluid outlets are configured to spray the fire-retardant fluid;
         a fire-retardant fluid reservoir configured to contain the fire-retardant fluid,
         a yaw pivot; and
         a pitch pivot,
            wherein the pitch pivot attaches to the turbine and allows the turbine to tilt skyward,
            wherein the yaw pivot attaches to the pitch pivot and to the tower,
            wherein the yaw pivot allows the central rotor to rotate 360 degrees around the tower,
         at least one camera configured to rotate 360 degrees around the tower,
            wherein the at least one camera is adapted for thermal imaging a surrounding environment;
         a thermo-heating system, wherein the thermo-heating system is configured to prevent any component of the apparatus from freezing in cold temperatures; and
   wherein the apparatus is constructed out of a lightweight tire-resistant material; and
   a computing unit comprising processor, a memory, and a set of instructions stored on the memory, said instructions that when executed by the processor, cause the system to automatically irrigate, monitor, and protect the environment from fire.

* * * * *